(12) United States Patent
Brooks et al.

(10) Patent No.: US 7,598,922 B2
(45) Date of Patent: Oct. 6, 2009

(54) DEPLOYABLE BOOMS

(75) Inventors: Raymond John Brooks, Stevenage (GB); Trevor Charles Baker, Stevenage (GB)

(73) Assignee: Astrium Limited, Stevenage (GB)

( * ) Notice: Subject to any disclaimer, the term of this patent is extended or adjusted under 35 U.S.C. 154(b) by 584 days.

(21) Appl. No.: 10/534,738

(22) PCT Filed: Apr. 1, 2005

(86) PCT No.: PCT/GB2005/050045

§ 371 (c)(1),
(2), (4) Date: May 12, 2005

(87) PCT Pub. No.: WO2005/097595

PCT Pub. Date: Oct. 20, 2005

(65) Prior Publication Data

US 2007/0146227 A1 Jun. 28, 2007

(30) Foreign Application Priority Data

Apr. 8, 2004 (EP) .................................. 04252099
Apr. 8, 2004 (GB) .................................. 0408005.7

(51) Int. Cl.
  *H01Q 1/08* (2006.01)
(52) U.S. Cl. .................................. 343/880; 343/DIG. 2
(58) Field of Classification Search ................ 343/878, 343/880, 881, 882, DIG. 2
See application file for complete search history.

(56) References Cited

U.S. PATENT DOCUMENTS

| 4,073,201 | A | 2/1978 | Taylor et al. |
| 5,673,459 | A | 10/1997 | Baghdasarian |
| 5,864,320 | A | 1/1999 | Baghdasarian |
| 6,124,835 | A | 9/2000 | Nguyen et al. |
| 6,424,314 | B1 | 7/2002 | Baghadasarian |
| 6,580,399 | B1 | 6/2003 | Ballinger et al. |
| 2002/0135532 | A1 | 9/2002 | Chiang |

FOREIGN PATENT DOCUMENTS

| EP | 0 892 460 A1 | 1/1999 |
| GB | 2 330 007 A | 4/1999 |

*Primary Examiner*—Trinh V Dinh
*Assistant Examiner*—Dieu Hien T Duong
(74) *Attorney, Agent, or Firm*—Crowell & Moring LLP

(57) ABSTRACT

An articulated boom comprises a support arm with a plurality of hingedly-connected joints. The arm is adapted and arranged to carry an antenna reflector so that in use, the reflector can move between a first stowed position in which the reflector is in folded condition and a second deployed position in which the reflector is in deployed condition. A spacecraft incorporates into one or more of its sides a plurality of such articulated booms. The support arms of the booms can be advantageously positioned at the circumference of the associated reflectors when in a stowed position, so as to allow the reflectors to be neatly stacked together within a space defined by the launch vehicle fairing.

18 Claims, 2 Drawing Sheets

DEPLOYABLE BOOMS

This application is a 371 of PCT/GB05/50045 filed Apr. 1, 2005.

FIELD OF THE INVENTION

The present invention concerns improvements relating to deployable booms. More particularly, but not exclusively, the present invention concerns improvements relating to articulated booms for deployment of one or more antenna reflectors in space.

BACKGROUND OF THE INVENTION

Single offset reflector antennas with short focal lengths deployed conventionally in space missions are known to be of limited applicability to linearly-polarised shaped beam coverages because of their poor cross-polar properties. These are generally incompatible with the stringent specifications placed on such space missions, which typically dictate the use of polarisation-sensitive reflectors or dual offset reflector geometries (for example, Gregorian-type reflector geometries). Such geometries tend to suffer from significant disadvantage in terms of mass and the amount of accommodation space taken up for accommodating component parts.

It is to be understood that single offset reflectors generate high cross-polar levels because of their fundamental asymmetry. This can be reduced if the reflector focal length is increased relative to the aperture diameter. Recent studies of deployment of two reflector configurations have shown that long focal lengths are advantageous in improving overall scanning performance, so that boom-deployed long focal length systems can be suitably used in multi-beam applications. Such systems are being increasingly proposed for the emerging Ka band market. It has also been found that when the ratio focal length to diameter approaches 2, the cross-polar performance improves sufficiently that the antenna can be used for dual polarised shaped beams in Ku band, for example.

OBJECTS AND SUMMARY OF THE INVENTION

The present invention aims to overcome or at least substantially reduce some of the above mentioned problems associated with known designs.

It is a principal object of the present invention to provide a compact and simple support structure for effective deployment of one or more antenna reflectors from a single side of the spacecraft. It is to be understood that the inventive structure finds utility in the support deployment of multiple reflectors in various space missions, and bears definite structural advantage in terms of weight saving, simplicity of design (by taking up less accommodation space) and efficient accommodation of its apertures/reflectors.

It is another principal object of the present invention to provide a support structure which can deploy relatively large diameter antenna reflectors with long focal lengths (typically, with focal length to diameter ratios greater than two), giving acceptable isolation and cross polar performance. This advantageously obviates the need for complex subreflector (Gregorian) designs.

It is another principal object of the present invention to provide a support structure with a flexible configuration of parts which can be suitably adapted for use with a wide range of antenna reflector diameters and focal lengths.

In broad terms, the present invention resides in the concept of providing an antenna reflector carried by an extendable boom of a predetermined sufficient length so that the reflector can be controllably moved by extension of the boom from a stowed position to a required deployed position.

More particularly, according to a first aspect of the present invention there is provided an articulated boom comprising: a support arm defining a number of hingedly-connected joints, the arm being adapted and arranged to carry an antenna reflector so that in use, the reflector can move between a first stowed position in which the reflector is in folded condition and a second deployed position in which the reflector is in deployed condition.

Further, according to a second aspect of the present invention there is provided an articulated boom for connection to a spacecraft vehicle comprising: a support arm defining a number of hingedly-connected joints, the arm being adapted and arranged to carry an antenna reflector so that in use, the reflector can move between a first stowed position in which the reflector is nested within a predetermined volume of the spacecraft vehicle and a second deployed position in which the reflector is deployed in space.

In this specification, it is to be understood that the term "dog-leg" in the proposed boom design is used to mean or cover any bend or curve in the boom which allows the boom structure to follow the circumference/periphery of the reflector (which it carries) and to pick up the mounting hard points.

In accordance with an exemplary embodiment of the invention which will be described hereinafter in detail, the support arm of the boom includes a bend ("dog-leg"). The "dog-leg" is shaped so as to permit the support arm of the boom design to be positioned at the circumference/periphery of the reflector when in stowed condition. Advantageously, this allows the boom structure when used in spacecraft to pick up on the spacecraft mounting hard points for launch constraint. Thus, in the context of antenna reflector deployment from the sidewall of a spacecraft, the "dog-leg" is effectively used to stow the boom with reflector close to the sidewall of the spacecraft, allowing the boom to be tied down for launch. In the context of multiple reflector deployment from the sidewall of a spacecraft, the "dog-leg" allows an optimal arrangement of booms and reflectors in the stowed configuration. In this stowed configuration, the booms are positioned at the circumference/ periphery of the reflectors, therefore allowing the reflectors to be stowed very close together and hence aiding accommodation within the launch vehicle fairing.

Advantageously, articulation of the boom design is achieved via up to four single-axis hingedly-connected joints. These joints are conveniently either stepper motors with harmonic drive output or spring-operated mechanical hinges.

Optionally, antenna pointing is provided by use of a two-axes antenna pointing mechanism or by use of articulated stepper motor harmonic drive units. Conveniently, the two-axis antenna pointing mechanism (APM) functions are mounted separately on the support arm of the boom and on the antenna reflector. For example, in the context of antenna reflector deployment from a sidewall of a spacecraft, one of the two-axis APM functions may be built into the boom close to the spacecraft, the other mounted onto the rear of the reflector. This has the advantage of reducing/minimising the mass load mounted onto the reflector, whilst providing the required two-axes geometry.

Advantageously, the support arm of the boom is configured to be sufficiently long so as to carry an antenna reflector of up to 3.5 metres diameter with an associated focal length of up to 7 metres (when deployed). For antenna reflector deployment from a spacecraft, this can achieve good RF performance from a single offset reflector, alleviating the need for a Gregorian design of antenna and thus saving mass and space on the spacecraft. Also, by using a sufficiently long boom for antenna reflector deployment from the side of a spacecraft, the associated feed structure can be mounted directly onto the spacecraft top floor, alleviating the need for large heavy feed tower structures. Further, such a boom design has the advantage that it can be readily adapted for carrying various kinds of antenna reflector (i.e. reflectors of different shape and size), within the limits imposed by the structural envelope for stowing the boom with reflector.

For antenna reflector deployment from a spacecraft, it is to be understood that the boom could be exposed to extreme temperatures in space (typically, in the temperature range +140° C. to −180° C.) on account of its substantial length (up to 7 metres long) when deployed a long way out from the spacecraft. More particularly, this could cause significant problems with the hinged joints of the boom between the hinge mechanisms and the various composite (carbon fibre) tube sections of the support arm. The inventors have now recognised that this problem can be addressed by bolting the hingedly-connected joints using metal bracket means with sufficient flexibility built into it to accommodate for significant changes in the material properties of the boom (for example, changes in size between the materials) in response to significant temperature variations (typically, between +140° C. to −180° C.).

As previously described, the present invention extends to spacecraft with an articulated boom of the above described type, the boom fixed at one end to the spacecraft structure and the opposing end of the boom fixed to the antenna reflector. In this way, the antenna reflector can be moved by movement of the supporting boom from a stowed position (for example, when mounted against a side of the spacecraft structure) to a required deployed position some distance out from the spacecraft. Optionally, the boom end fixed to the spacecraft structure is mounted directly to the feed structure. This has the advantage of removing platform distortions from the antenna geometry, giving improved overall performance.

Advantageously, for antenna reflector deployment from a spacecraft, the boom with reflector when in stowed position is foldably mounted to a sidewall of the spacecraft structure on a plurality of hold-down points (for example, pyrotechnic hold-downs), the hold-down points being capable of release prior to deployment of the boom/reflector. It is to be also appreciated that the hold-down points can be suitably formed to provide a degree of compliance in a number of different directions if desired, permitting the boom and the spacecraft structure not to impart unwanted thermal expansion loads on each other.

Further, the present invention extends to a satellite/spacecraft vehicle incorporating into one or more of its sides two or more articulated booms of the above described type. Optionally, the support arms of the two or more booms are positioned at the circumference of the associated reflectors when in stowed condition, such as to allow the reflectors to be stacked together within a space defined by the associated launch vehicle fairing. It is thus possible to deploy two or more reflectors, using one boom per reflector, from one or each side of the satellite/spacecraft vehicle. It is thus also possible in principle to deploy multiple reflectors, using one boom per reflector, from one or each side of the satellite/spacecraft vehicle, if desired.

Thus, in a further aspect, the present invention provides a method of stacking a plurality of deployable antenna reflectors in spacecraft, comprising: providing a first antenna reflector with boom of the above described type; moving said first antenna reflector to a first nesting position close to a sidewall of the spacecraft in such a manner that its supporting boom follows the circumference of the reflector along a first path; providing a second antenna reflector with boom of the above described type; and moving said second antenna reflector to a second nesting position close to the sidewall of the spacecraft in such a manner that its supporting boom follows the circumference of the reflector along a second path and such that the first and second reflectors are disposed in juxtaposition in stacked relationship. Optionally, the spaced-apart arms of the booms, when in stacked condition, are disposed circumferentially around their associated reflectors in opposite senses (i.e. the arms of the booms are of generally opposite curvature). This particular mode of stacking has the advantage that there is no physical interference between the different component parts of the booms. Optionally, additional antenna reflectors with booms can be stacked in the spacecraft if desired, based upon the above described method of stacking.

The present invention also extends to a satellite/spacecraft vehicle incorporating into one or each of its sides a hingedly-mounted support structure including an antenna reflector with articulated boom of the above described type. In such an arrangement, the associated feed structure is preferably mounted to a separately-formed floor (for example, the top floor) of the satellite/spacecraft vehicle. This obviates the need for a complicated feed mounting (towers) structure in order to achieve long focal lengths. Also, this mounting arrangement permits the thermal control of the feed assembly to be achieved simply.

The present invention also extends to a satellite/spacecraft vehicle incorporating into one/each of its sides (a) a first hingedly-mounted support structure including an antenna reflector with supporting boom of the above described type, and (b) a second separate hingedly-mounted support structure for carrying two or more other antenna reflectors. The second support structure is preferably a frame of simple design in place of the above described boom structure. It is also envisaged that the two or more respective other antenna reflectors could be directly mounted onto the frame.

The present invention also extends to a reflector system for space-based applications incorporating an antenna reflector with supporting boom of the above described type.

Further, the present invention extends to an antenna structure incorporating the above described reflector system.

It is to be appreciated that the proposed deployable boom has a simplified, flexible and mechanically robust design and can be easily implemented for deployment of an antenna reflector in various space-based applications. The proposed boom design could equally be used for planetary reflecting applications, if desired.

The above and further features of the invention are set forth with particularity in the appended claims and will be described hereinafter with reference to the accompanying drawings.

DETAILED DESCRIPTION OF EXEMPLARY EMBODIMENTS

Figure 1:
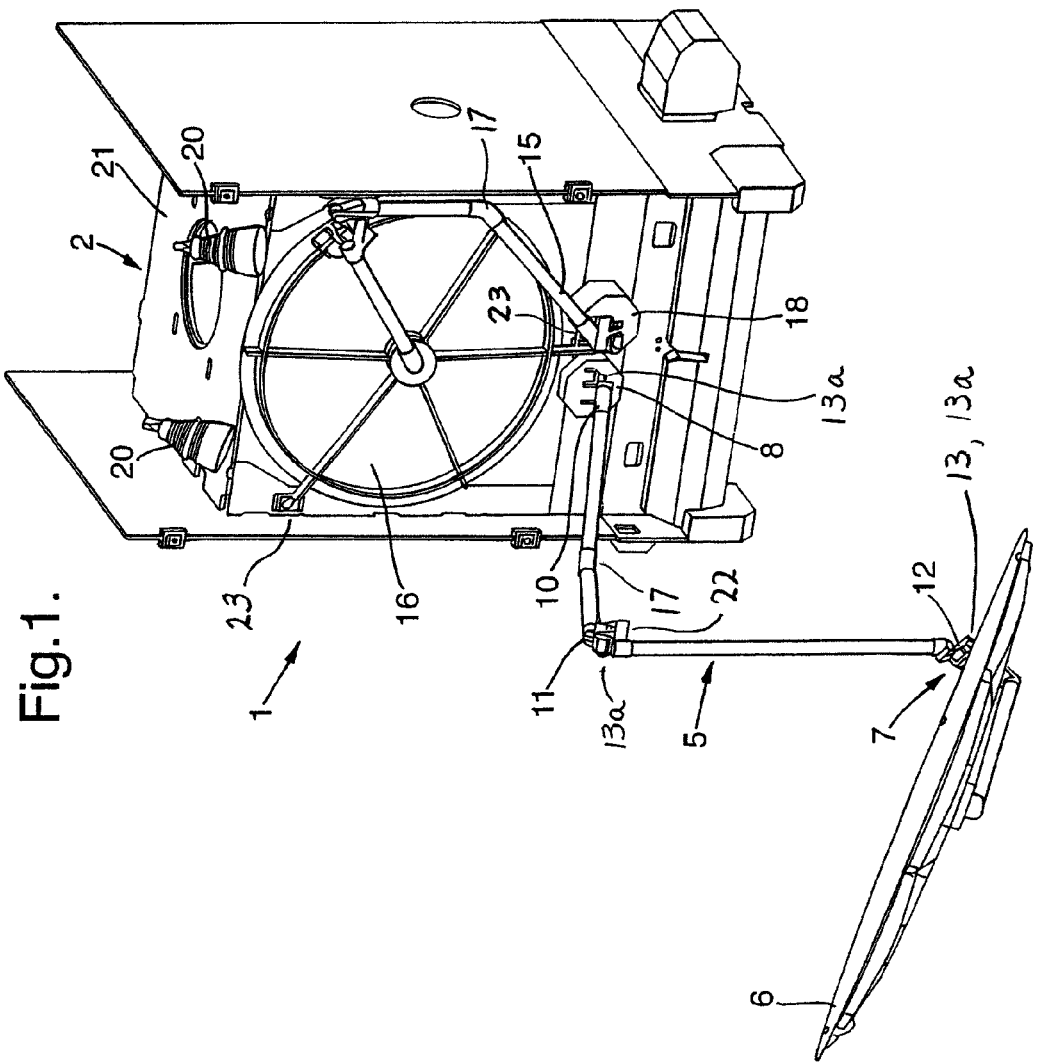
FIG. 1 is a schematic view of a proposed deployable support structure with dual reflectors for a spacecraft embodying the present invention, the Figure showing an antenna reflector with supporting boom in deployed condition and another antenna reflector with supporting boom in stowed condition.

Referring first to FIG. 1, there is schematically shown therein a preferred deployable support structure 1 with dual reflectors for a spacecraft vehicle 2 embodying the present invention. The support structure 1 comprises a first arm carrier in the form of an articulated boom 5 having an antenna reflector 6 in deployed condition at its lower end 7 and a mount 8 for connecting the boom 5 to a section of a sidewall of the spacecraft 2 at its upper end. The arm carrier of the boom 5 has a shoulder joint 10, an elbow joint 11 and a wrist joint 12. Significantly, the boom 5 has a dog-leg 17 to facilitate stowage of the reflector 6 against the spacecraft's sidewall. (The dog-leg is best seen in the second articulated boom 15 in FIG. 1, and in the boom 5' in FIG. 2.) The joints 10, 11, 12 are hingedly-connected at a plurality of points along the axial length of the arm carrier by means of a spring-operated mechanical hinge mechanism 13 or other arrangement, such as an articulated stepper motor harmonic drive unit 13a, to permit pivotal movement of the arm carrier together with its associated reflector in directions perpendicular to its axis. It will be understood that the antenna reflector 6 is of a standard configuration (around 3.5 m diameter) with long focal length capability.

As shown in FIG. 1, the support structure 1 further comprises a second arm carrier in the form of another articulated boom 15 having an antenna reflector 16 in stowed condition at its upper end and a mount 18 for connecting the boom 15 to a different section of the same sidewall of the spacecraft 2 at its lower end. The reflector 16 is also of standard configuration (around 3.5 m diameter).

As shown, the stowed boom 15 with antenna reflector 16 compactly nests within a circular area of the spacecraft sidewall, such that, if desired, the other boom 5 with reflector 6 (shown to be deployed) can be subsequently stacked on top whilst nesting close to the spacecraft sidewall in stowed condition (not shown). In such a stacked configuration (not shown), the arms of the booms 5, 15 are wrapped part-circumferentially around the associated stowed reflectors in opposite senses so that there is no physical interference between the different component parts of the booms 5, 15.

As also shown, the stowed boom 15 with antenna reflector 16 is mounted against the spacecraft sidewall on a plurality of pyrotechnic hold-down points 23 (only two of which are visible in FIG. 1). Each hold-down point is configured to allow compliance in certain directions to ensure that the boom and spacecraft structure do not impart unwanted thermal expansion loads on each other. It will be understood that the hold-down points are operably released prior to deployment of the boom/reflector.

In the described embodiment of FIG. 1, the booms 5, 15 are about 7 m long. By using booms of this length the feed structure 20 is mounted (as shown) directly onto the spacecraft top floor 21, alleviating the need for large heavy feed tower structures. The booms 5, 15 are formed of lightweight carbon fibre composite material. Because the boom structures are long, it will be understood that these structures extend some distance out into space from the spacecraft when deployed, and will become exposed to extreme temperatures, typically in the temperature range +140° C. to −180° C., during deployment. The investors have recognised that this can cause problems with the boom joints between the hinge mechanisms and the carbon fibre composite (tube) sections. To address these problems, the boom joints are bolted using a metal bracket 22 with flexibility built into it so as to allow for change(s) in size between the materials.

In operation of the thus described arrangement of FIG. 1 it will be understood that the two reflectors 6, 16 can be deployed individually or sequentially from the same side of the spacecraft (using one boom per reflector). It will also be understood that antenna pointing can be provided to achieve this deployment by use of 2 axes APM (antenna pointing mechanism) or by use of articulated steppermotor harmonic drive units 13a. In this embodiment, the APM 2 axes functions are mounted in the boom close to the reflector edge. This has the advantage of reducing/minimising the mass mounted on the reflectors whilst still providing a 2-axes geometry and allowing APM mass to be easily tied down for launch.

A second embodiment of the present invention will now be described. The second embodiment is similar to the first embodiment and so corresponding parts have been assigned corresponding reference numerals with primes.

Figure 2:
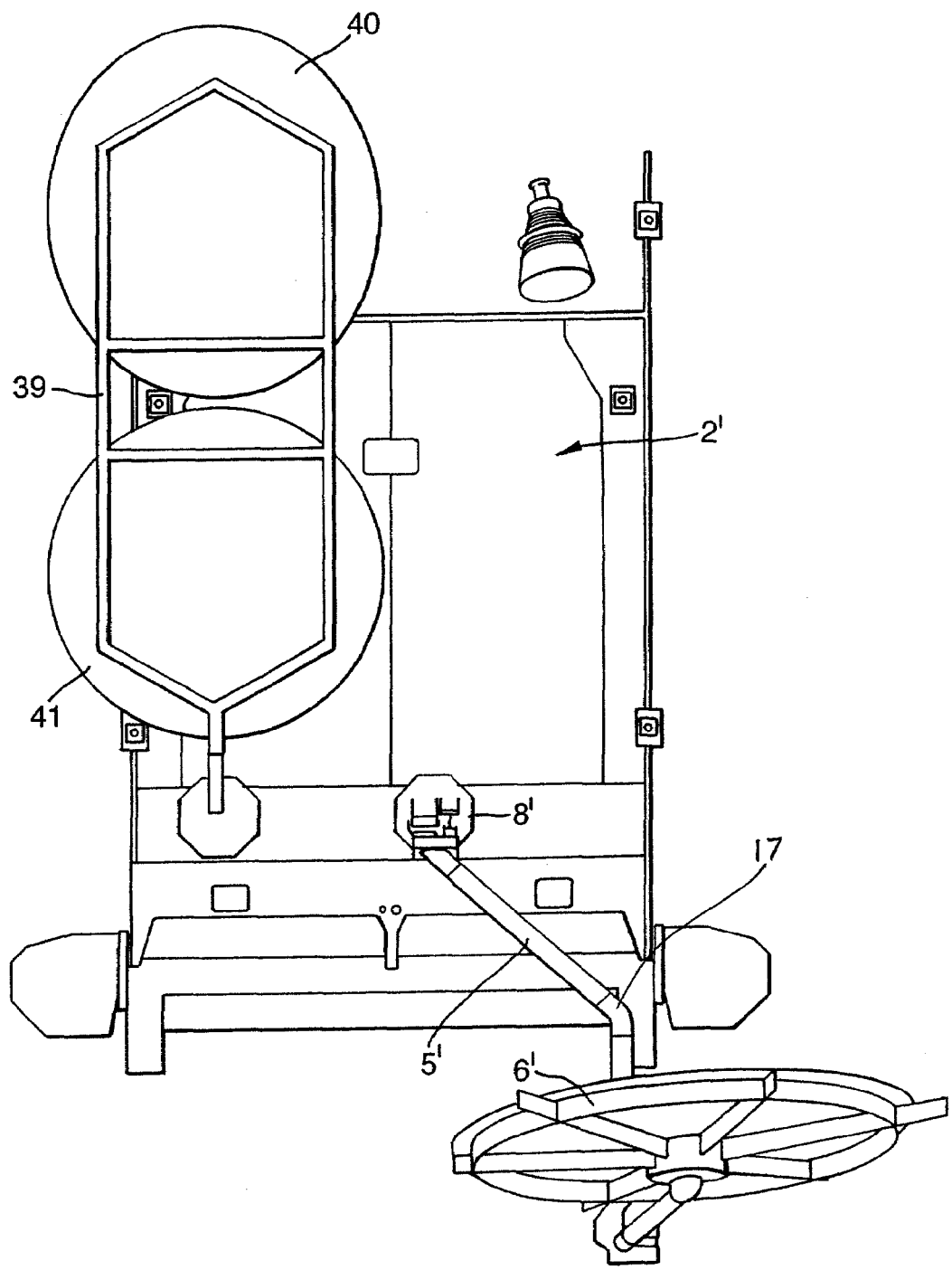
FIG. 2 is a schematic view of another proposed deployable support structure for a spacecraft embodying the present invention.

Referring to FIG. 2, there is schematically shown therein another proposed deployable support structure 1' for a spacecraft 2' embodying the present invention. In common with the embodiment of FIG. 1, this second embodiment has an articulated boom 5' with antenna reflector 6' in deployed condition at its lower end and a mount 8' for connecting the boom to a section of a sidewall of the spacecraft 2' at its upper end. It is to be understood that the arm carrier of the boom 5' has the same hingedly-connected joints structure as described previously in relation to the booms of the first embodiment of FIG. 1. Thus, the specific boom structure 5' will not be described again in order to avoid unnecessary repetition.

The arrangement of FIG. 2 differs from that of FIG. 1 only in that, rather than having a second articulated boom (as shown in FIG. 1), there is provided instead a hingedly-mounted frame 39 for carrying two more antenna reflectors 40, 41. The reflectors 40, 41 as shown, are of identical size and shape and are directly mounted onto the frame at two separate mounts. It is to be understood that the reflectors are of a standard configuration with long focal length capability. In a further alternative embodiment (not shown) similar to that of FIG. 2, the reflectors mounted on the frame could instead be of different size and shape and be mounted onto the frame via APM mechanisms.

In the above described embodiments, it is to be appreciated that the described articulated boom structure bears definite advantage in the following various respects:

Large diameter reflectors with long focal lengths, f/d>2, give acceptable cross-polar performance without the need for Gregorian designs (sub reflectors).

Simpler design taking up less accommodation space, therefore allowing more antennas & larger total spacecraft aperture, to be mounted on each Spacecraft.

Allows standard mounting of reflector/boom & mounting feeds on CM floor obviates the need for complicated feed mounting structure or towers, to achieve long focal lengths.

Provides more options to reduce scatter as position of feeds and reflector is more flexible with respect to spacecraft structures.

Thermal control of feed assembly and feed chains may be easier to achieve by mounting directly onto CM floor (internal heat pipes).

Having thus described the present invention by reference to two preferred embodiments, it is to be appreciated that the embodiments are in all respects exemplary and that modifications and variations are possible without departure from the spirit and scope of the invention. Essentially, any boom arrangement could be used which relies upon the proposition of supporting the antenna reflector with an extendable articulated boom of sufficient length so that the reflector is controllably moved by extension of the boom from stowed position to deployed position. For example, whilst in the first embodiment two such boom structures are used, the arrangement could alternatively be modified to provide additional boom structures from the same side or from different sides of the spacecraft, thereby enabling the effective deployment of multiple antenna reflectors from one or more sides of the spacecraft.

Furthermore, the number of hinged joints in the boom design and the length of boom to be deployed could also be appropriately varied, for example, so as to ensure that antenna reflectors of different shape/size can be effectively deployed.

It is also to be appreciated that the proposed boom design finds utility in various planetary reflecting applications as well as in various space-based applications.

It is also to be understood that any feature described in relation to any one embodiment may be used alone, or in combination with other features described, and may also be used in combination with one or more features of any other of the embodiments, or any combination of any other of the embodiments.

The invention claimed is:

1. An articulated boom for a space based antenna reflector system having an antenna reflector supported on said boom; wherein:
   said boom comprises a support arm having at least three hinged joints;
   said support arm is adapted and arranged to carry the antenna reflector so that in use, the antenna reflector can move between a first, stowed, position in which the reflector is nested within a predetermined volume of a spacecraft; and a second, deployed, position in which the reflector is deployed in space outside said predetermined volume;
   said support arm includes a dog-leg portion located between two of said hinged joints, that permits stowage of said antenna reflector in said stowed position; and
   said dog-leg portion is configured and positioned such that said dog-leg portion extends at least partially along a circumference of the antenna reflector when said antenna reflector is in said stowed position.

2. The articulated boom as claimed in claim 1, wherein at least one of said hinged joints comprises an articulated stepper motor harmonic drive unit.

3. The articulated boom as claimed in claim 1, wherein at least one of said hinged joints comprises a spring-operated mechanical hinge.

4. The articulated boom as claimed in claim 1, wherein:
   the antenna reflector has a diameter of approximately 3.5 meters with an associated focal length of approximately 7 meters; and
   the support arm is configured to be sufficiently long to carry the 3.5 meter antenna reflector.

5. The articulated boom as claimed in claim 1, wherein the hinged joints are bolted using flexible metal brackets, which brackets are sufficiently flexible to accommodate changes in material properties of the boom in response to temperature variations between +140° C. and −180° C.

6. The articulated boom as claimed in claim 1, wherein:
   one end of the support arm is mounted to an associated feed structure of the spacecraft, via one of said hinged joints; and
   the opposing end of the support arm is mounted to the antenna reflector, via another of said hinged joints.

7. The articulated boom as claimed in claim 6, wherein:
   in the stowed position, the antenna reflector is foldably mounted to a sidewall of the spacecraft on a plurality of hold-down points; and
   said hold-down points are operably released prior to deployment of the reflector.

8. The articulated boom as claimed in claim 7, wherein said hold-down points are formed such as to provide a degree of compliance, such that the boom and the spacecraft do not impart unwanted thermal expansion loads on each other.

9. A spacecraft comprising:
   at least two booms of the type claimed in claim 1; and
   at least two antenna reflectors that are deployable on said booms from at least one side of the spacecraft.

10. The spacecraft as claimed in claim 9, wherein support arms of the at least two booms are positioned at a circumference of associated reflectors when in the stowed position, so as to allow the reflectors to be stacked together within a space defined by an associated launch vehicle fairing.

11. A spacecraft incorporating into at least one side thereof
   (a) a first hinge-mounted support structure including an antenna reflector with a boom as defined in claim 1; and
   (b) a second different hinge-mounted support structure for carrying a plurality of antenna reflectors.

12. A reflector system for space-based applications incorporating an antenna reflector with supporting boom as defined in claim 1.

13. An antenna structure incorporating a reflector system as defined in claim 12.

14. The articulated boom as claimed in claim 1, wherein, in said stowed position, said dog-leg portion lies within a first plane that is substantially parallel to a second plane defined by said antenna reflector.

15. The articulated boom as claimed in claim 14, wherein:
   the dog-leg portion is coupled to the spacecraft by a hinged joint that provides for pivotal rotation of said dog-leg portion about a pivot axis; and
   said pivotal axis is substantially parallel to said first plane.

16. A spacecraft having an antenna reflector supported on a boom; wherein;
   said boom comprises a support arm having at least three hinged joints;
   said support arm is adapted and arranged to carry the antenna reflector so that in use, the antenna reflector can move between a first, stowed, position in which the reflector is nested within a predetermined volume of the spacecraft; and a second, deployed, position in which the reflector is deployed in space outside said predetermined volume;
   said support arm includes a dog-leg portion located between two of said hinged joints, that permits stowage of said antenna reflector in said stowed position; and
   said dog-leg portion is configured and positioned such that said dog-leg portion extends at least partially along a circumference of the antenna reflector when said antenna reflector is in said stowed position.

17. The spacecraft as claimed in claim 16, wherein an associated feed structure is mounted to a separately-formed floor of the spacecraft.

18. An articulated boom for a space based antenna reflector system having an antenna reflector supported on said boom, said boom comprising:
   a first hinged joint for connecting a first end of said boom to a wall of a spacecraft;
   a second hinged joint for connecting a second end of said boom to said antenna reflector; and a third hinged joint which connects a first portion of said boom to a second portion of said boom at a point intermediate said first and second ends of said boom; wherein said boom is adapted and arranged to carry the antenna reflector so that in use, the antenna reflector can move between a first, stowed, position in which the reflector is nested within a predetermined volume of said spacecraft; and a second, deployed, position in which the reflector is deployed in space outside said predetermined volume;

one of said first and second portions of said boom includes a dog-leg portion that permits stowage of said antenna reflector in said stowed position; and said dog-leg portion is configured and positioned such that, when said reflector is in said stowed position, said dog-leg portion is disposed in a plane adjacent one side of said antenna reflector, and extends in said plane at least partially along a circumference of the antenna reflector.

* * * * *